US012689831B2

(12) United States Patent  (10) Patent No.: US 12,689,831 B2

Ren et al.  (45) Date of Patent: Jul. 21, 2026

(54) ANTI-SHAKE MECHANISM AND LENS MODULE

(71) Applicant: AAC Microtech (Changzhou) Co., Ltd., Changzhou City (CN)

(72) Inventors: Zhang Ren, Changzhou (CN); Wei Song, Changzhou (CN); Yun Tang, Changzhou (CN); Xiujiang Si, Changzhou (CN)

(73) Assignee: AAG Microtech (Changzhou) Co., Ld., Changzhou (CN)

( * ) Notice: Subject to any disclaimer, the term of this patent is extended or adjusted under 35 U.S.C. 154(b) by 55 days.

(21) Appl. No.: 18/979,441

(22) Filed: Dec. 12, 2024

(65) Prior Publication Data

US 2025/0373948 A1    Dec. 4, 2025

Related U.S. Application Data

(63) Continuation of application No. PCT/CN2024/096535, filed on May 31, 2024.

(51) Int. Cl.
H04N 23/68 (2023.01)
H04N 23/55 (2023.01)

(52) U.S. Cl.
CPC ........... H04N 23/687 (2023.01); H04N 23/55 (2023.01)

(58) Field of Classification Search
CPC ....... H04N 23/55; H04N 23/687; H04N 23/54
USPC ...................................... 348/208.7
See application file for complete search history.

(56) References Cited

U.S. PATENT DOCUMENTS

| | | | | | |
|---|---|---|---|---|---|
| 9,977,219 | B2* | 5/2018 | Cho | ..................... | G02B 27/646 |
| 10,057,493 | B2* | 8/2018 | Park | ..................... | H04N 23/683 |
| 10,705,311 | B2* | 7/2020 | Huang | ................. | G02B 27/646 |
| 10,764,475 | B2* | 9/2020 | Hu | ......................... | H04N 23/55 |
| 10,955,641 | B2* | 3/2021 | Hu | ..................... | H02K 41/0356 |
| 11,809,016 | B2* | 11/2023 | Min | ......................... | G02B 7/08 |
| 12,282,203 | B2* | 4/2025 | Min | ......................... | G03B 5/02 |
| 2012/0057252 | A1* | 3/2012 | Ishiguro | .................. | G02B 7/08 |
| | | | | | 359/824 |
| 2014/0177056 | A1* | 6/2014 | Hayashi | ................... | G02B 7/08 |
| | | | | | 359/557 |
| 2016/0011394 | A1* | 1/2016 | Cho | ..................... | G02B 27/646 |
| | | | | | 359/822 |
| 2016/0161757 | A1* | 6/2016 | Hee | ..................... | G02B 27/646 |
| | | | | | 359/557 |
| 2016/0277684 | A1* | 9/2016 | Park | ......................... | G02B 7/04 |
| 2018/0157004 | A1* | 6/2018 | Huang | ..................... | G02B 7/08 |
| 2018/0239107 | A1* | 8/2018 | Cho | ......................... | G03B 3/10 |

(Continued)

*Primary Examiner* — Pritham D Prabhakher

(74) *Attorney, Agent, or Firm* — Wiersch Law Group

(57) ABSTRACT

The present disclosure discloses an anti-shake mechanism including includes a rectangular base, an image sensor module, an elastic support member, and a driving assembly. The magnet unit of the driving assembly includes an inner magnet and an outer magnet. The inner magnet includes a first inner portion extended along the first direction, a second inner portion extended along the second direction, and a first connection portion connected with the first inner portion and the second inner portion; the outer magnet includes a first outer portion fixed to the first inner portion, a second outer portion fixed to the second inner portion, and a second connection portion fixed to the first connection portion. The first connection portion and the second connection portion are arranged corresponding to a corner of the base.

9 Claims, 8 Drawing Sheets

(56) References Cited

U.S. PATENT DOCUMENTS

| | | | | |
|---|---|---|---|---|
| 2018/0335601 A1* | 11/2018 | Hu | .......................... | G03B 5/00 |
| 2018/0338069 A1* | 11/2018 | Hu | ......................... | H04N 23/55 |
| 2018/0372988 A1* | 12/2018 | Hu | .......................... | G02B 7/09 |
| 2021/0006720 A1* | 1/2021 | Enta | ...................... | H04N 23/45 |
| 2021/0215904 A1* | 7/2021 | Cho | .................... | G02B 27/646 |
| 2024/0337859 A1* | 10/2024 | Xu | ...................... | G02B 27/646 |

* cited by examiner

100

52

100

100

ANTI-SHAKE MECHANISM AND LENS MODULE

FIELD OF THE PRESENT DISCLOSURE

The present disclosure relates to optical imaging technologies, especially relates to an anti-shake mechanism and a lens module applied in portable mobile terminals.

DESCRIPTION OF RELATED ART

With the development of the mobile terminals, consumers have an increasing demand for higher image quality captured by lens modules in portable mobile terminals. The lens module is generally provided with an anti-shake mechanism to obtain high-quality image.

In related art, the OIS function is achieved by moving the image sensor relative to the imaging lens. Specifically, the Anti-shake mechanism includes a fixed base, and an image sensor module moving relative to the base, an elastic member for supporting the image sensor module, and a driving assembly providing driving force. The driving assembly includes a coil and a magnet. For driving the image sensor module to move along two directions, four magnet bars are provided on four sides of the base. For improving the utilization rate of the magnet, two magnet bars are expected to be glued into an L-shaped magnet with a corner corresponding to corner positions. However, due to the repulsive force, the two single magnet bars are not prone to be glued together.

Therefore, it is necessary to provide an improved Anti-shake mechanism to overcome the problems mentioned above.

SUMMARY OF THE INVENTION

One object of the present disclosure is to provide an anti-shake mechanism with higher magnet utilization rate.

The sensor drive mechanism includes a base with a receiving space; an image sensor module suspended in the receiving space, including: a movable frame connected to the elastic member; and an image sensor mounted on the movable frame; an elastic support member configured to suspend the image sensor module; and a driving assembly configured to drive the image sensor module to move along a first direction and a second direction perpendicular with each other, including a coil and a magnet assembly separately mounted on the base and the movable frame; wherein the magnet assembly includes at least one magnet unit opposite to the coil; each of the at least one magnet unit includes an inner magnet and an outer magnet fixed to a side of the inner magnet away from the image sensor; the inner magnet and the outer magnet are magnetized along an optical axis direction in opposite directions; the inner magnet includes a first inner portion extended along the first direction, a second inner portion extended along the second direction, and a first connection portion connected with the first inner portion and the second inner portion; the outer magnet includes a first outer portion fixed to the first inner portion, a second outer portion fixed to the second inner portion, and a second connection portion connected with the first outer portion and the second outer portion; the second connection portion is fixed to the first connection portion; the first direction and the second direction are perpendicular with the optical axis direction; the base is rectangular; the first connection portion and the second connection portion are arranged corresponding to a corner of the base.

As an improvement, the inner magnet and the outer magnet are integrally molded.

As an improvement, a total number of the at least one magnet unit is four; the four magnet units are arranged at intervals and located at corners of the base separately; along the first direction, the first inner portions of adjacent two magnet units are arranged opposite to each other; the first outer portions of adjacent two magnet units are arranged opposite to each other; along the second direction, the second inner portions of adjacent two magnet units are arranged opposite to each other; the second outer portions of adjacent two magnet units are arranged opposite to each other.

As an improvement, the inner magnet and the outer magnet are both U-shaped; the inner magnet includes two first connection portions separately connected to two ends of the first inner portion, and two second inner portions separately connected to the two first connection portions; the two second inner portions are opposite to each other along the first direction; the outer magnet includes two second connection portions separately connected to two ends of the first outer portion, and two second outer portions separately connected to the two second connection portions; a number of at least one magnet unit is two; the two magnet units are arranged on two sides of the imager sensor along the second direction.

As an improvement, the inner magnet and the outer magnet are both U-shaped; the inner magnet includes two first connection portions separately connected to two ends of the second inner portion, and two first inner portions separately connected to the two first connection portions; the two first inner portions are opposite to each other along the second direction; the outer magnet includes two second connection portions separately connected to two ends of the second outer portion, and two first outer portions separately connected to the two second connection portions; a number of at least one magnet unit is two; the two magnet units are arranged on two sides of the imager sensor along the first direction.

As an improvement, the base includes a bottom cover, a top cover spaced apart away from the bottom cover, and a side cover enclosed the receiving space with the top cover and the bottom cover; the driving assembly comprises two magnet assemblies; the two magnet assemblies are separately mounted on the top cover and the bottom cover and opposite to the coil along the optical axis direction.

As an improvement, the driving assembly further includes a magnetic plate sandwiched between the top cover and the magnet unit, and/or between the bottom cover and the magnet unit.

As an improvement, the inner magnets of the two magnet assemblies have opposite magnetization directions; the outer magnets of the two magnet assemblies have opposite magnetization directions.

As an improvement, an end of the first inner portion is aligned with an end of the first outer portion; an end of the second inner portion is aligned with an end of the second outer portion.

Another object of the present disclosure is to provide a lens module, comprising the anti-shake mechanism as described above, and a lens assembly opposite to the anti-shake mechanism along the optical axis direction; the anti-shake mechanism is driven to move along the first direction and the second direction relative to the lens assembly for achieving OIS function.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
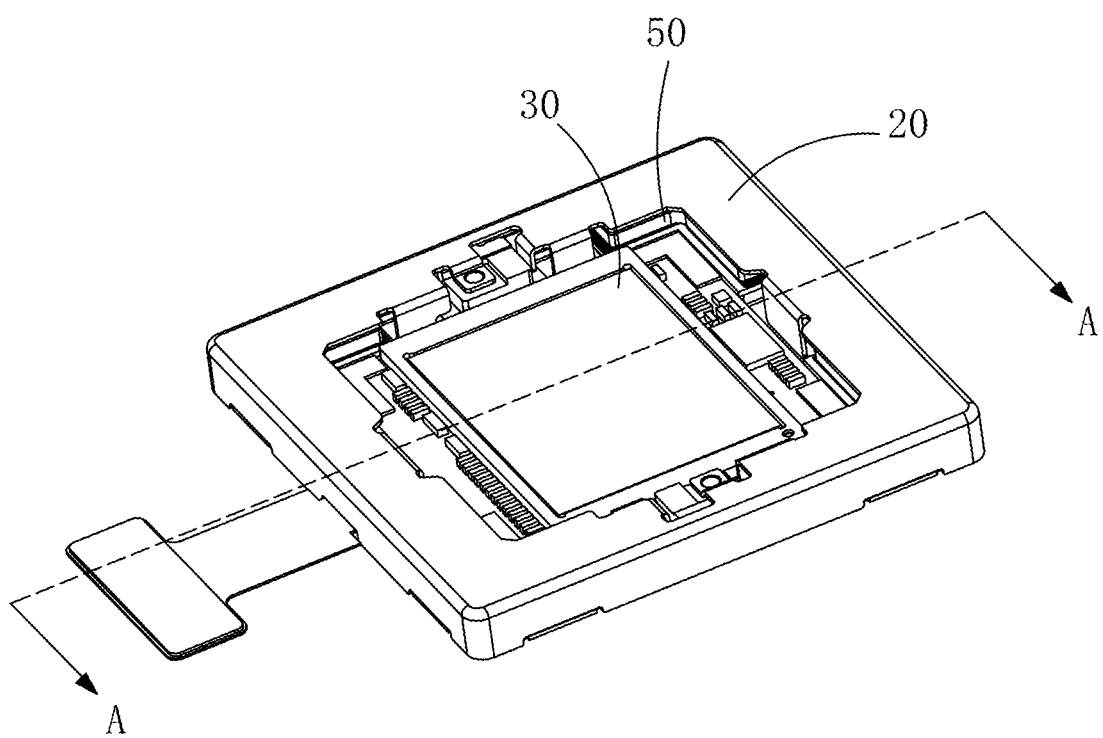
FIG. 1 is an isometric view of an anti-shake mechanism in accordance with an exemplary embodiment of the present disclosure.
Figure 2:
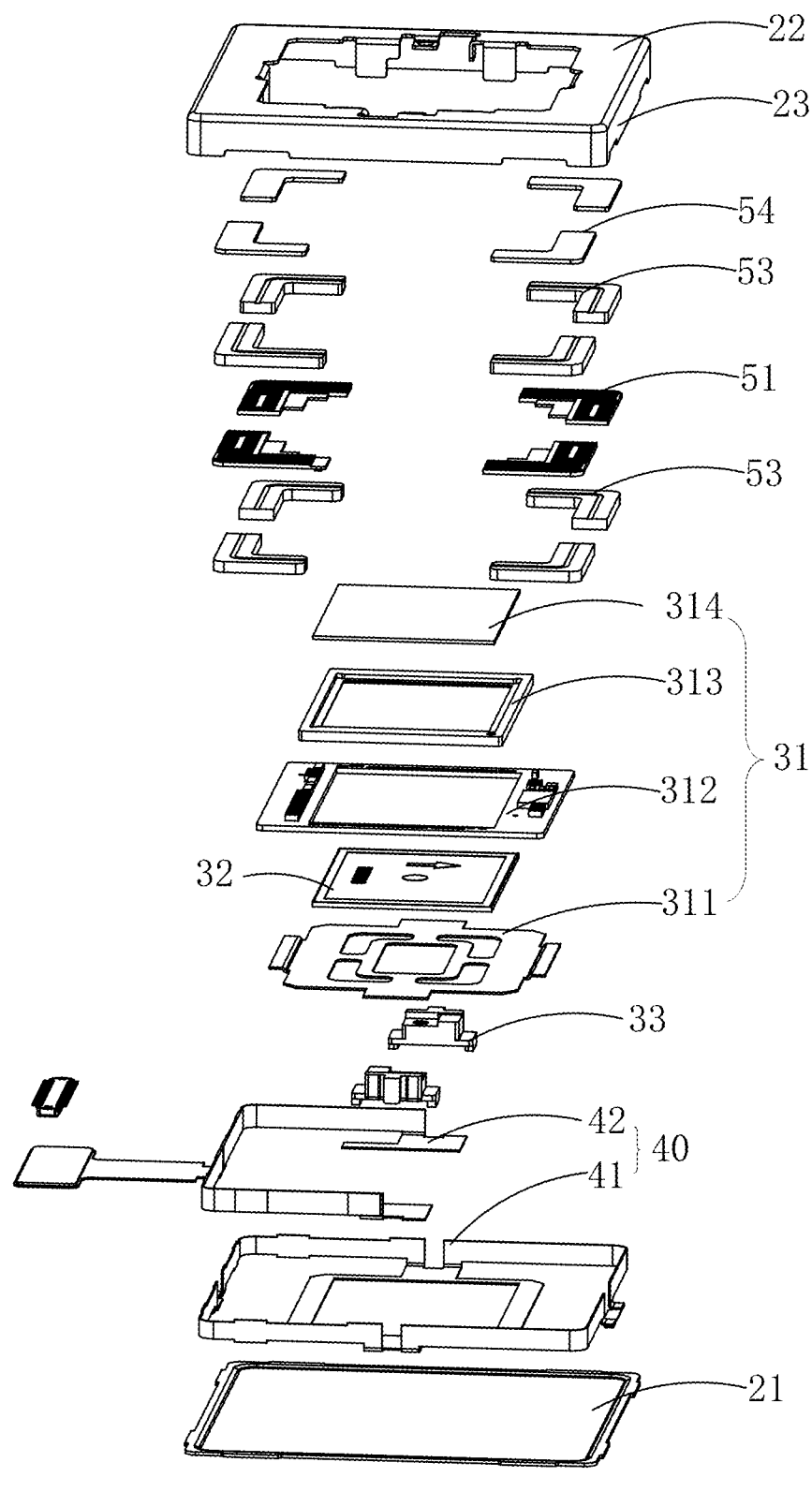
FIG. 2 is an exploded view of the anti-shake mechanism in FIG. 1.
Figure 3:
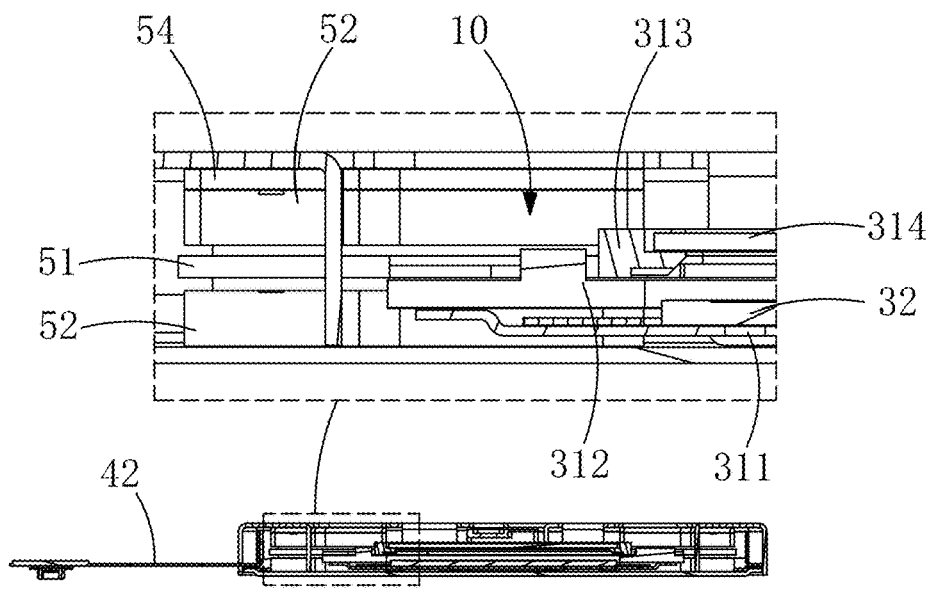
FIG. 3 is a cross-sectional view of the anti-shake mechanism taken along line A-A in FIG. 1.

Please refer to FIGS. 1, a lens module 1000 provided by an exemplary embodiment of the present disclosure includes an anti-shake mechanism 100 and a lens assembly 200 opposite to the anti-shake mechanism 100 along an optical axis direction Z. The anti-shake mechanism 100 is driven to move in a plane perpendicular with the optical axis direction Z relative to the lens assembly for achieving OIS function and improving the image quality of the lens module 1000.

As shown in FIGS. 2-4 and FIG. 6, the anti-shake mechanism 100 includes a base 20 with a receiving space 10, an image sensor module 30 suspended in the receiving space 10, an elastic support member 40 configured to suspend the image sensor module 30, and a driving assembly 50 configured to drive the image sensor module 30 to move along a first direction X and a second direction Y perpendicular with each other. The first direction X and the second direction Y are perpendicular with the optical axis direction Z.

The base 20 includes a bottom cover 21, a top cover 22 spaced apart away from the bottom cover 21, and a side cover 23 enclosed the receiving space 10 with the top cover 22 and the bottom cover 21. It should be noted that light is incident on the image sensor module 30 through an opening on the top cover 22.

The image sensor module 30 includes a movable frame 31 connected to the elastic member 40, and an image sensor 32 mounted on the movable frame 31. Specifically, the movable frame 31 includes a magnetic plate 311 mounted on the elastic member 40 and spaced apart from the base 21, a circuit board 312 fixed on the magnetic plate 311, a first support frame 313 fixed on the circuit board 312, and an optical filter 314 provided on the support frame 313. The image sensor 32 is mounted on the magnetic plate 311. The circuit board 312 is hollow thus surrounding the image sensor 32. The first support frame 313 is located at a side of the circuit board 312 away from the magnetic plate 311 for supporting the optical filter 314 above the image sensor 32.

The elastic member 40 includes an elastic plate 41 fixed to the magnetic plate 311, and a FPC 42 fixed to the elastic plate 41. Moreover, the elastic plate 41 includes a first fixation portion 411 fixed to the magnetic plate 311, a second fixation portion 412 mounted on the base 20, and an elastic portion 413 connected with the first fixation portion 411 and the second fixation portion 412. In one embodiment, the first fixation portion 411 is mounted on an outer edge of the magnetic plate 311 in a circular manner thus surrounding the optical filter 314. The FPC 42 includes a first conductive segment 421 fixed to the first fixation portion 411, a second conductive segment 422 fixed to the elastic portion 413, and a third conductive segment 423 mounted on the base 20 and electrically connected to an external circuit.

Please refer to FIGS. 2-5, the driving assembly 50 includes a coil 51 mounted on the movable frame 31, and a magnet assembly 53 mounted on the base 20. To be specific, the magnet assembly 53 includes at least one magnet unit 52 opposite to the coil 51. Each of the at least one magnet unit 52 includes an inner magnet 521 and an outer magnet 522 fixed to a side of the inner magnet 521 away from the image sensor 32. The inner magnet 521 and the outer magnet 522 are identical-shaped. It should be understood that the inner magnet 521 and the outer magnet 522 has a same height along the optical axis direction Z and located on the same plane perpendicular with the optical axis direction Z. Besides, the inner magnet 521 and the outer magnet 522 are magnetized along the optical axis direction Z in opposite directions. The inner magnet 521 and the outer magnet 522 are integrally molded. In other embodiment, the inner magnet 521 and the outer magnet 522 would be glued to each other.

Furthermore, the inner magnet 521 includes a first inner portion 5211 extended along the first direction X, a second inner portion 5212 extended along the second direction Y, and a first connection portion 5213 connected with the first inner portion 5211 and the second inner portion 5212. The outer magnet 522 includes a first outer portion 5221 fixed to the first inner portion 5211, a second outer portion 5222 fixed to the second inner portion 5212, and a second connection portion 5223 connected with the first outer portion 5221 and the second outer portion 5222. The second connection portion 5223 is fixed to the first connection portion 5213.

An end of the first inner portion 5211 is aligned with an end of the first outer portion 5221. An end of the second inner portion 5212 is aligned with an end of the second outer portion 5222.

Figure 4:
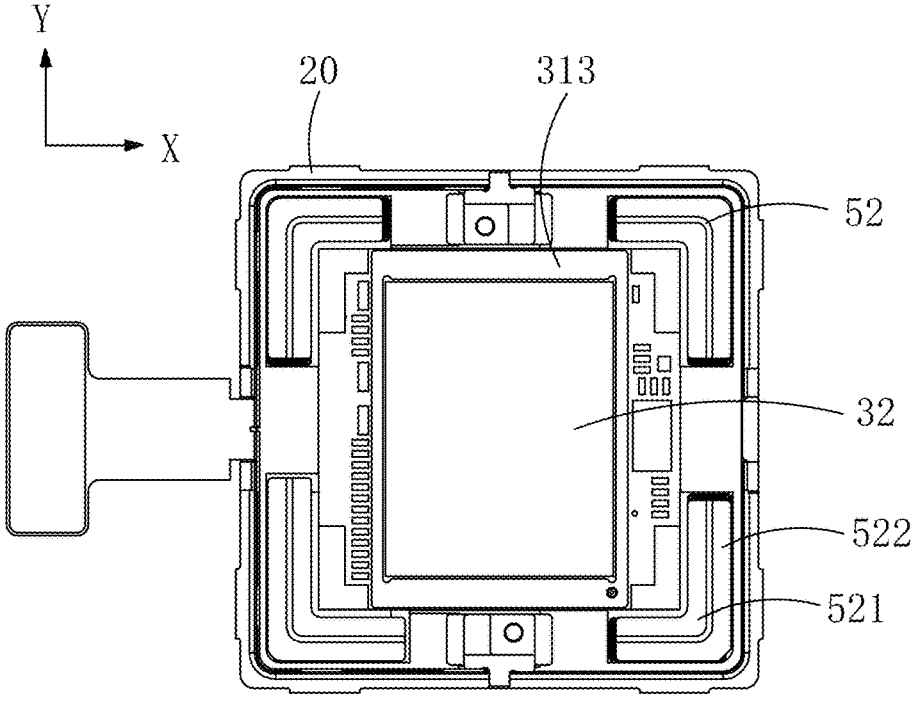
FIG. 4 is a top view of part of the anti-shake mechanism in FIG. 1.
Figure 5:
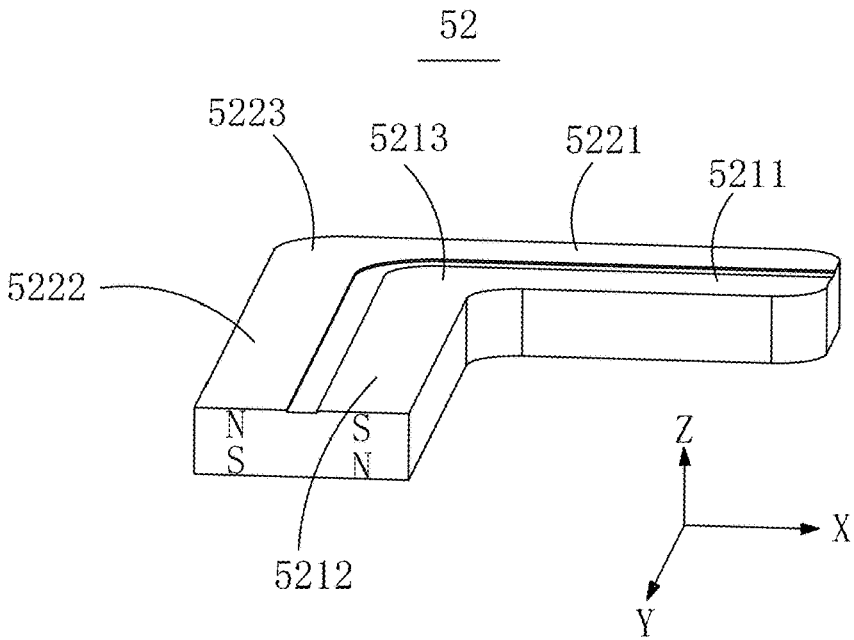
FIG. 5 is an isometric view of a magnet assembly of the anti-shake mechanism in FIG. 1.
Figure 6:
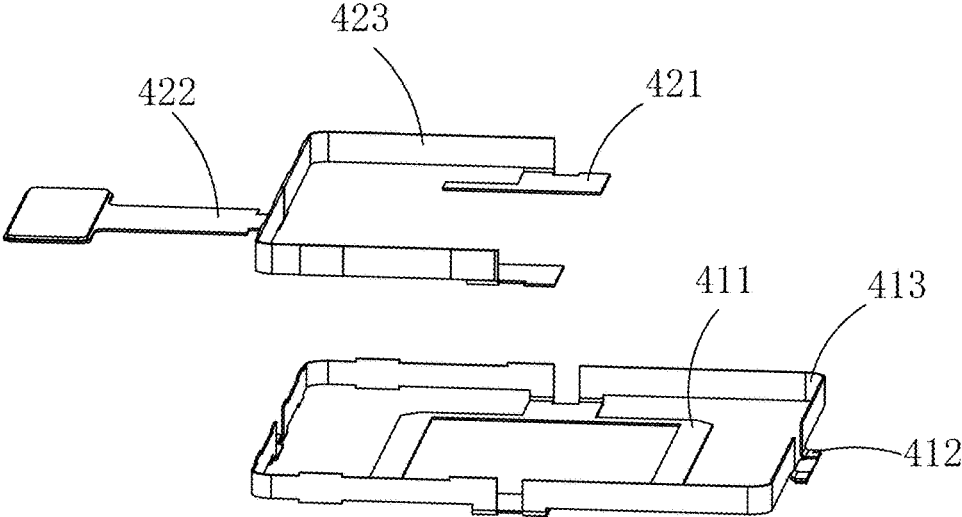
FIG. 6 is an isometric view of an elastic member of the anti-shake mechanism in FIG. 1.
Figure 7:
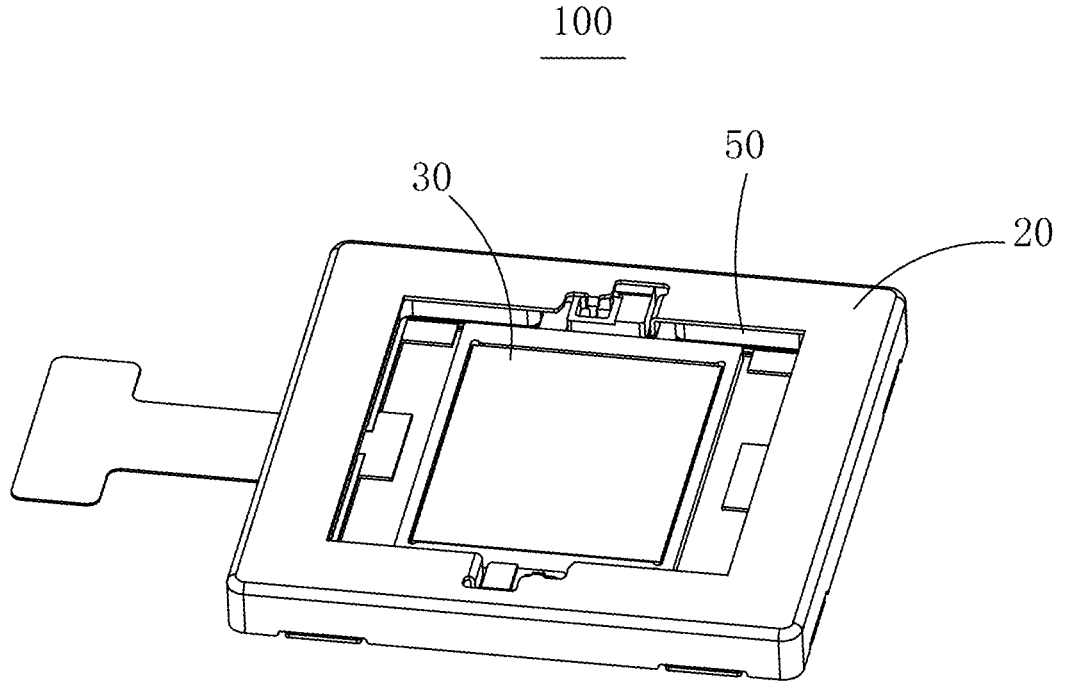
FIG. 7 is an isometric view of an anti-shake mechanism in accordance with another exemplary embodiment of the present disclosure.
Figure 8:
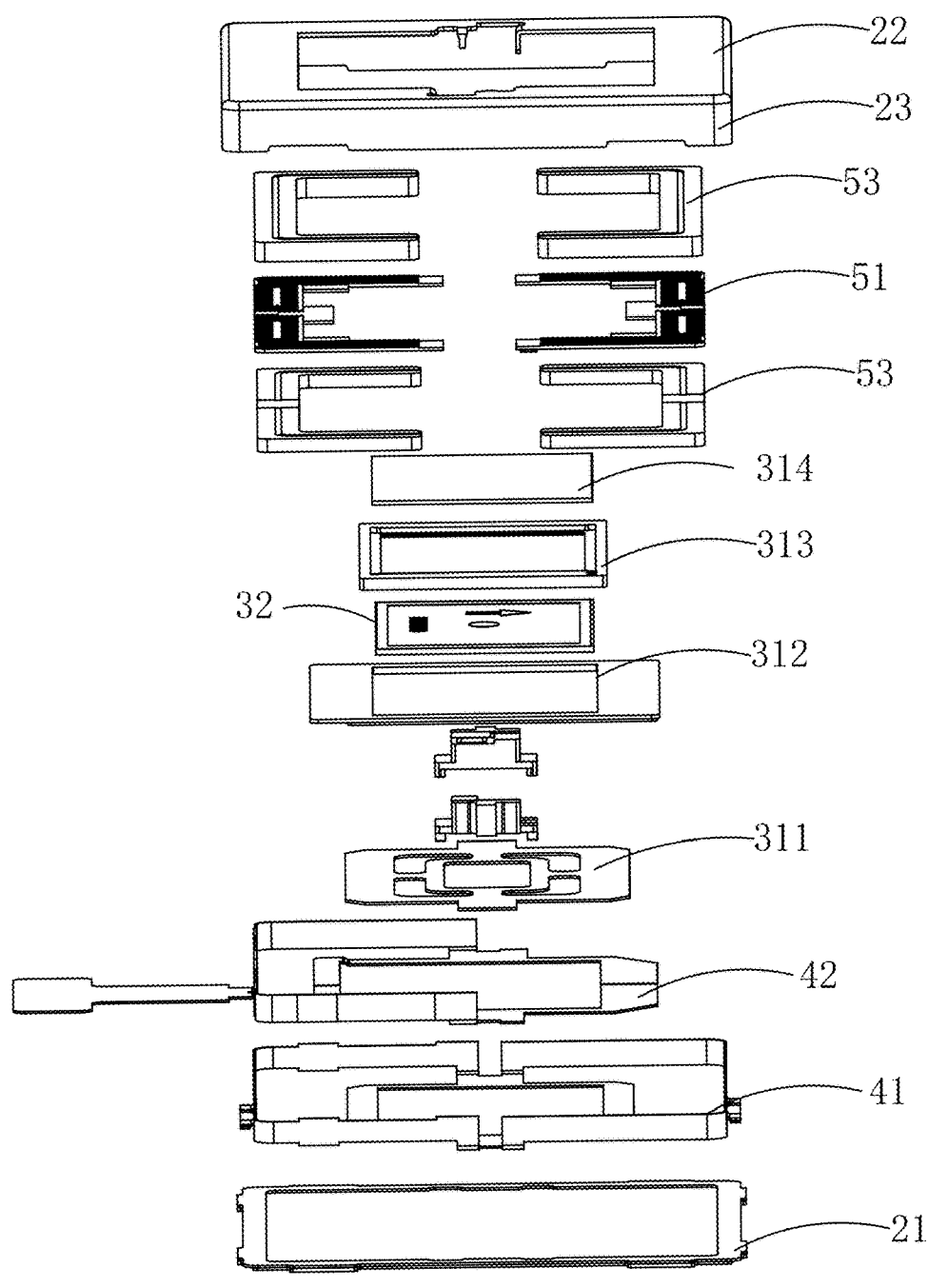
FIG. 8 is an exploded view of the anti-shake mechanism in FIG. 7.
Figure 9:
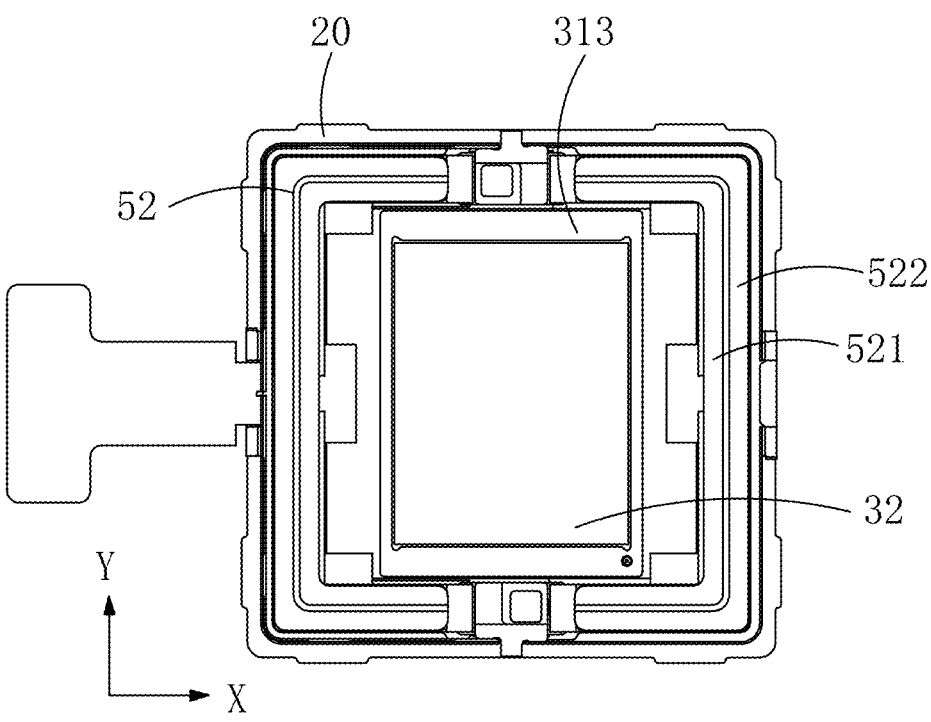
FIG. 9 is a top view of part of the anti-shake mechanism in FIG. 7.
Figure 10:
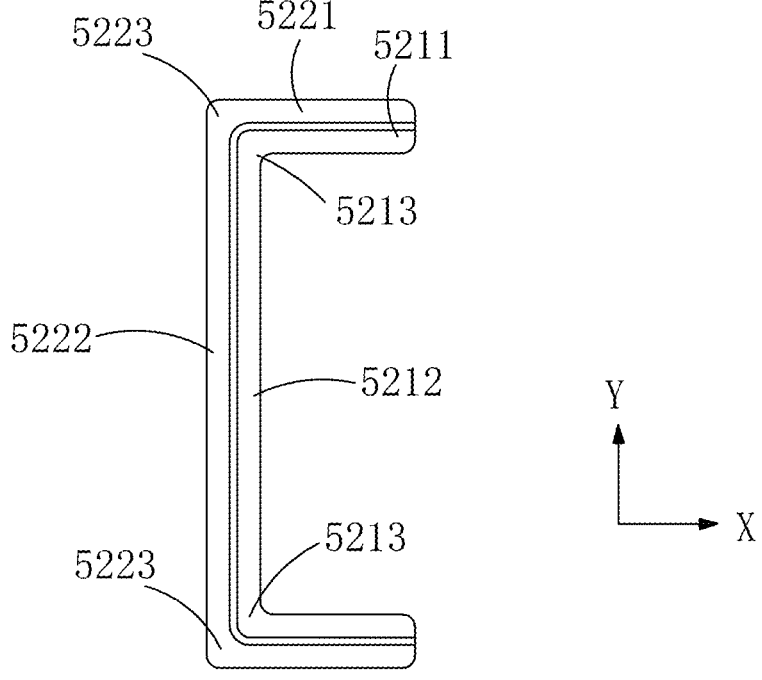
FIG. 10 is a top view of a magnet assembly of the anti-shake mechanism in FIG. 7.

As shown in FIGS. 4-5, the base 20 is rectangular. The first connection portion 5213 and the second connection portion 5223 are arranged corresponding to a corner of the base 20.

As shown in FIGS. 1-6, a total number of the at least one magnet unit 52 is four. The four magnet units 52 are arranged at intervals. Each of the four magnet units 52 is located at a perspective one of the corners of the base 20. It should be understood that the rectangular base 20 has four corners. Along the first direction X, the first inner portions 5211 of adjacent two magnet units 52 are arranged opposite to each other, the first outer portions 5221 of adjacent two magnet units 52 are arranged opposite to each other. Along the second direction Y, the second inner portions 5212 of adjacent two magnet units 52 are arranged opposite to each other, the second outer portions 5222 of adjacent two magnet units 52 are arranged opposite to each other. Thus, the first connection portion 5213 and the second connection portion 5223 are located corresponding to the corner position of the base 20, thereby effectively improving the magnet utilization rate and enhancing the anti-shake performance of the anti-shake mechanism 100.

As shown in FIGS. 7-10, in the anti-shake mechanism 100 provided by another exemplary embodiment of the present disclosure, a total number of the at least one magnet unit 52 is two. The two magnet units 52 are arranged on two sides of the imager sensor 32 along the first direction X. Furthermore, the inner magnet 521 and the outer magnet 522 are both U-shaped. The openings of the magnet units 52 are opposite to each other. Specifically, the inner magnet 521 includes two first connection portions 5213 separately connected to two ends of the second inner portion 5212, and two first inner portions 5211 separately connected to the two first connection portions 5213. The two first inner portions 5211 of one respective inner magnet 521 are opposite to each other along the second direction Y. The outer magnet 522 includes two second connection portions 5223 separately connected to two ends of the second outer portion 5222, and two first outer portions 5221 separately connected to the two second connection portions 5223.

Figure 11:
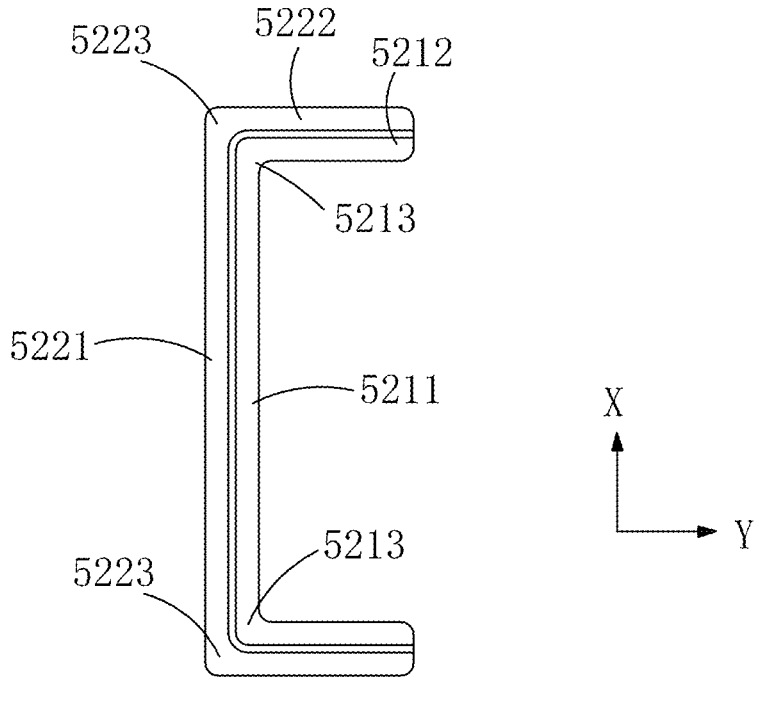
FIG. 11 is a top view of the magnet assembly of the anti-shake mechanism in FIG. 7.
Figure 12:
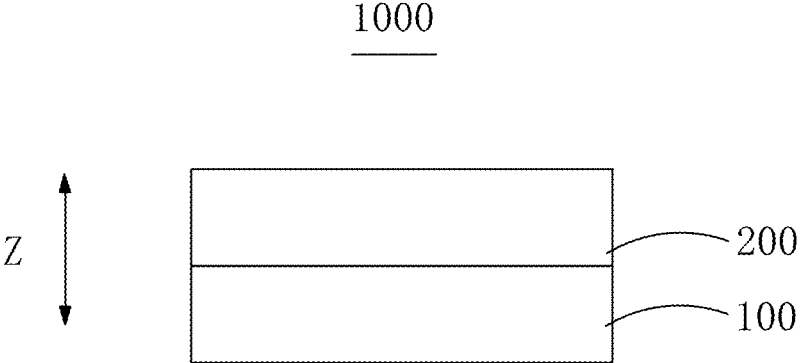
FIG. 12 is an isometric view of a lens module in accordance with an exemplary embodiment of the present disclosure.

In other embodiment, as shown in FIG. 11, The two magnet units 52 are arranged on two sides of the image sensor 32 along the second direction Y. the inner magnet 521 includes two first connection portions 5213 separately connected to two ends of the first inner portion 5211, and two second inner portions 5212 separately connected to the two first connection portions 5213. The two second inner portions 5212 of one respective inner magnet 521 are opposite to each other along the first direction X. The outer magnet 522 includes two second connection portions 5223 separately connected to two ends of the first outer portion 5221, and two second outer portions 5222 separately connected to the two second connection portions 5223.

In addition, the driving assembly 50 includes two magnet assemblies 53. The two magnet assemblies 53 are separately mounted on the top cover 22 and the bottom cover 21 and opposite to the coil 51 along the optical axis direction Z. For further improving the magnet performance of the anti-shake mechanism 100, the driving assembly 50 includes a magnetic plate 54 sandwiched between the top cover 22 and the magnet unit 52, and/or between the bottom cover 21 and the magnet unit 52. The inner magnets 521 of the two magnet assemblies 53 have opposite magnetization directions. The outer magnets 522 of the two magnet assemblies 53 have opposite magnetization directions.

Moreover, the elastic portion 413 of the elastic plate 41 surrounds the magnet unit 52 at an interval.

The coil 51 is mounted on the circuit board 312. In one embodiment, the coil 51 includes a coil board 511 and a winding 512 fixed to the coil board 511. Furthermore, the image sensor module 30 includes a second support frame 33 fixed to the first fixation portion 411 of the elastic plate 41. An end of the coil board 511 is fixed to the circuit board 312, and the other end of the coil board 511 is supported on the second support frame 33.

Compared with the related art, the driving assembly of the anti-shake mechanism includes a magnet unit mounted on the base and a coil mounted on the image sensor module. The magnet unit includes an inner magnet and an outer magnet. The inner magnet includes a first inner portion extended along the first direction, a second inner portion extended along the second direction, and a first connection portion connected with the first inner portion and the second inner portion. The outer magnet includes a first outer portion fixed to the first inner portion, a second outer portion fixed to the second inner portion, and a second connection portion connected with the first outer portion and the second outer portion. The second connection portion is fixed to the first connection portion. The first connection portion and the second connection portion are located corresponding to the corner position of the rectangular base, thereby effectively improving the magnet utilization rate and enhancing the anti-shake performance of the anti-shake mechanism.

What is claimed is:

1. An anti-shake mechanism comprising:
   a base with a receiving space;
   an image sensor module suspended in the receiving space, comprising:
   a movable frame connected to the elastic member; and
   an image sensor mounted on the movable frame;
   an elastic support member configured to suspend the image sensor module; and
   a driving assembly configured to drive the image sensor module to move along a first direction and a second direction perpendicular with each other, comprising a coil and a magnet assembly separately mounted on the base and the movable frame; wherein
   the magnet assembly comprises at least one magnet unit opposite to the coil;
   each of the at least one magnet unit comprises an inner magnet and an outer magnet fixed to a side of the inner magnet away from the image sensor;
   the inner magnet and the outer magnet are magnetized along an optical axis direction in opposite directions;
   the inner magnet comprises a first inner portion extended along the first direction, a second inner portion extended along the second direction, and a first connection portion connected with the first inner portion and the second inner portion;
   the outer magnet comprises a first outer portion fixed to the first inner portion, a second outer portion fixed to the second inner portion, and a second connection portion connected with the first outer portion and the second outer portion;
   the second connection portion is fixed to the first connection portion;
   the first direction and the second direction are perpendicular with the optical axis direction; the base is rectangular;
   the first connection portion and the second connection portion are arranged corresponding to a corner of the base;
   the inner magnet and the outer magnet are both U-shaped;

the inner magnet includes two first connection portions separately connected to two ends of the first inner portion, and two second inner portions separately connected to the two first connection portions;

the two second inner portions are opposite to each other along the first direction;

the outer magnet includes two second connection portions separately connected to two ends of the first outer portion, and two second outer portions separately connected to the two second connection portions;

a number of at least one magnet unit is two;

the two magnet units are arranged on two sides of the imager sensor along the second direction.

2. The anti-shake mechanism as described in claim 1, wherein the inner magnet and the outer magnet are integrally molded.

3. The anti-shake mechanism as described in claim 1, wherein a total number of the at least one magnet unit is four; the four magnet units are arranged at intervals and located at corners of the base separately; along the first direction, the first inner portions of adjacent two magnet units are arranged opposite to each other; the first outer portions of adjacent two magnet units are arranged opposite to each other; along the second direction, the second inner portions of adjacent two magnet units are arranged opposite to each other; the second outer portions of adjacent two magnet units are arranged opposite to each other.

4. The anti-shake mechanism as described in claim 1, wherein the base comprises a bottom cover, a top cover spaced apart away from the bottom cover, and a side cover enclosed the receiving space with the top cover and the bottom cover; the driving assembly comprises two magnet assemblies; the two magnet assemblies are separately mounted on the top cover and the bottom cover and opposite to the coil along the optical axis direction.

5. The anti-shake mechanism as described in claim 4, wherein the driving assembly further comprises a magnetic plate sandwiched between the top cover and the magnet unit, and/or between the bottom cover and the magnet unit.

6. The anti-shake mechanism as described in claim 4, wherein the inner magnets of the two magnet assemblies have opposite magnetization directions; the outer magnets of the two magnet assemblies have opposite magnetization directions.

7. The anti-shake mechanism as described in claim 1, wherein an end of the first inner portion is aligned with an end of the first outer portion; an end of the second inner portion is aligned with an end of the second outer portion.

8. A lens module, comprising the anti-shake mechanism as described in claim 1, and a lens assembly opposite to the anti-shake mechanism along the optical axis direction; wherein the anti-shake mechanism is driven to move along the first direction and the second direction relative to the lens assembly for achieving OIS function.

9. An anti-shake mechanism comprising:

a base with a receiving space;

an image sensor module suspended in the receiving space, comprising:

a movable frame connected to the elastic member; and an image sensor mounted on the movable frame;

an elastic support member configured to suspend the image sensor module; and a driving assembly configured to drive the image sensor module to move along a first direction and a second direction perpendicular with each other, comprising a coil and a magnet assembly separately mounted on the base and the movable frame; wherein the magnet assembly comprises at least one magnet unit opposite to the coil;

each of the at least one magnet unit comprises an inner magnet and an outer magnet fixed to a side of the inner magnet away from the image sensor;

the inner magnet and the outer magnet are magnetized along an optical axis direction in opposite directions;

the inner magnet comprises a first inner portion extended along the first direction, a second inner portion extended along the second direction, and a first connection portion connected with the first inner portion and the second inner portion;

the outer magnet comprises a first outer portion fixed to the first inner portion, a second outer portion fixed to the second inner portion, and a second connection portion connected with the first outer portion and the second outer portion;

the second connection portion is fixed to the first connection portion;

the first direction and the second direction are perpendicular with the optical axis direction; the base is rectangular;

the first connection portion and the second connection portion are arranged corresponding to a corner of the base;

the inner magnet and the outer magnet are both U-shaped; the inner magnet includes two first connection portions separately connected to two ends of the second inner portion, and two first inner portions separately connected to the two first connection portions;

the two first inner portions are opposite to each other along the second direction; the outer magnet includes two second connection portions separately connected to two ends of the second outer portion, and two first outer portions separately connected to the two second connection portions;

a number of at least one magnet unit is two;

the two magnet units are arranged on two sides of the imager sensor along the first direction.

* * * * *